July 16, 1940.  H. M. McDONALD  2,207,928
APPARATUS FOR THE CLARIFICATION AND DEODORIZATION OF MILK AND CREAM
Filed Nov. 19, 1937   3 Sheets-Sheet 1
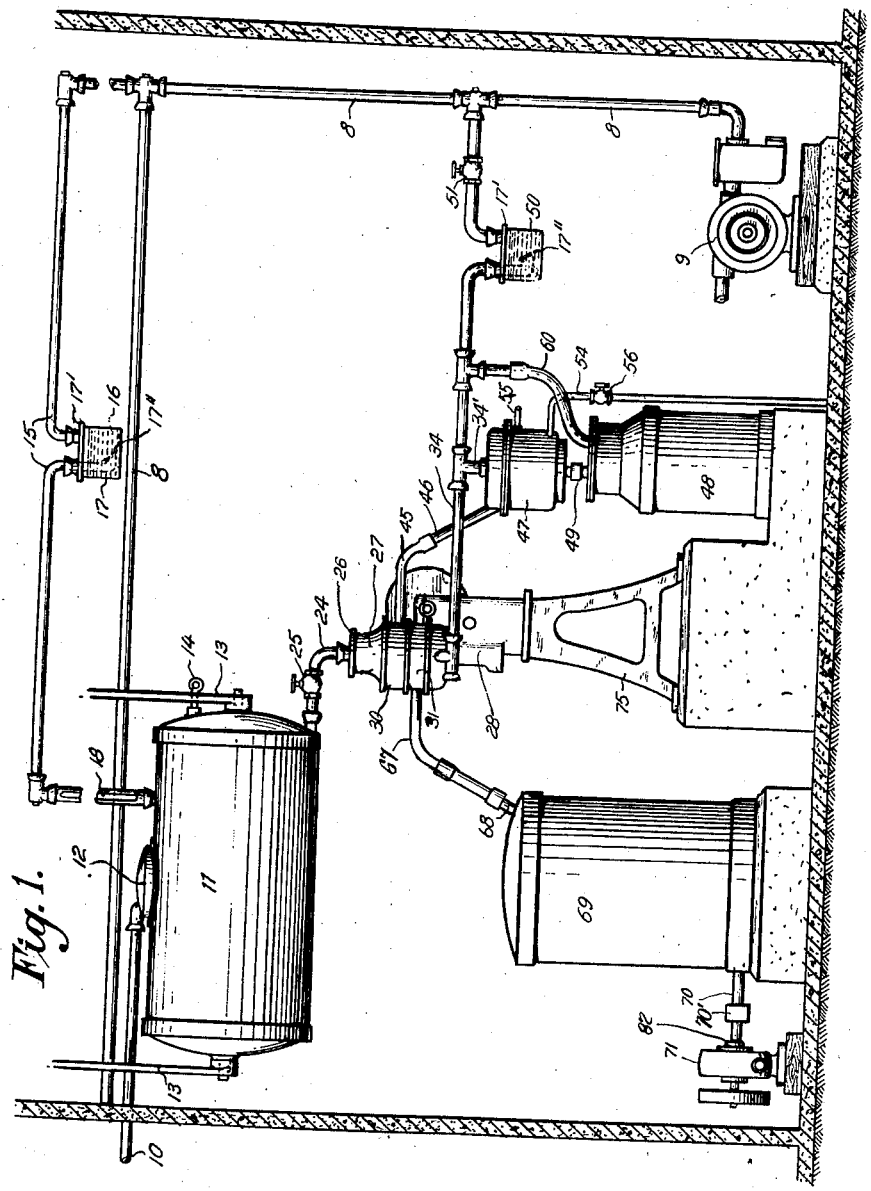

July 16, 1940.  H. M. McDONALD  2,207,928
APPARATUS FOR THE CLARIFICATION AND DEODORIZATION OF MILK AND CREAM
Filed Nov. 19, 1937   3 Sheets-Sheet 2

H. M. McDonald
INVENTOR
By: Glascock Downing & Seebold
ATTYS.

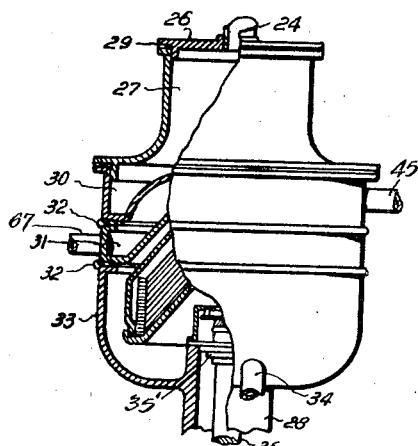

Patented July 16, 1940.

2,207,928

UNITED STATES PATENT OFFICE 2,207,928

APPARATUS FOR THE CLARIFICATION AND DEODORIZATION OF MILK AND CREAM

Hector Murdoch McDonald, Meeniyan, Gippsland, Victoria, Australia

Application November 19, 1937, Serial No. 175,526
In Australia November 19, 1936

9 Claims. (Cl. 31—2)

This invention relates to improvements in apparatus for the clarification and deodorization of milk and cream and refers especially, but is not limited, to apparatus wherein milk is drawn from cows and conveyed to suitable containers under the influence of vacuum.

In vacuum controlled milking machines, it has ben customary to locate a milk releaser between the teat cups and a milk receiving vessel or between the teat cups and a cooler arranged in communication with a milk receiving vessel, the object of the releaser being to enable a substantially continuous flow of the milk without unduly breaking down the vacuum in the pipes communicating with the teat cups. The disadvantage experienced with milking machines employing a releaser is that the milk in passing from the releaser comes into contact with the atmosphere and is thereby liable to be contaminated with dust or other impurities therein and the milk is subjected to such turbulence that the most efficient separation of the cream therefrom in the subsequent operation is not obtained.

I am aware that it has been proposed to arrange the teat cups of milking machines in communication with a cooler and a closed milk receiving can or vessel, both being subjected to a vacuum, whereby the milk will be delivered direct to the can or vessel. The advantage of this system of handling the milk is that it is passed to the can or vessel substantially free of feed and other deleterious odours and contaminating influences and can be delivered to a factory or dairy in a hygienic condition.

The last mentioned method of handling the milk is more or less satisfactory in cases where it is delivered to the butter factory prior to the separation of the cream therefrom or to the dairyman for retail distribution, but when the separation of the cream therefrom is effected on the dairy farm, the milk and cream are liable to be contaminated by impurities in the atmosphere and their keeping qualities to be impaired in consequence. This method also necessitates double handling of the milk and thereby occasions considerable expense of time and labour.

The present invention provides a simple and economical method of and apparatus for effecting the collection, separation or clarification, cooling and canning of the cream and milk under vacuum in a continuous operation whereby the milk and cream will be deodorized and protected from contaminating influences and without being subjected to any undue turbulence, thereby ensuring them being maintained in a more satisfactory condition for consumption or for use in the manufacture of food products therefrom.

One of the objects of the invention is to provide means for maintaining an even and balanced vacuum in the milk receiving, cream separating, cooling and canning units of the apparatus whereby the milk and cream will flow freely through the whole system without frothing or being subjected to turbulence and the volatile content thereof will be effectually deodorized.

Another object of the invention is to provide means for isolating the different units of the system from the atmosphere and thereby prevent contamination of the milk and cream from odoriferous vapors arising from the vacuum pump, the pulsator of the milking machine and air pipe lines upon any partial or complete breakdown of the vacuum and to obviate the setting up of equalising currents or surges in the milk and cream as they pass to and through different units due to variations in the vacuum.

A further object of the invention is to provide means for obviating any possibility of the milk entering the vacuum pump and impairing the operation of the same.

I accomplish the above mentioned object by providing an apparatus comprising a closed vessel for receiving milk from the teat cups of milking machines, a closed centrifugal separator, one or more closed receptacles for collecting the separated cream and skim milk; means for maintaining an even or balanced vacuum in the closed receiving vessel, the separator and collecting vessels, separate connections from the receiving vessel, the separator and collecting vessels to a vacuum pump, means for preventing "back lash" in or the admission of air to the receiving, separating and collecting units should the said pump cease to function, and float controlled means for preventing milk passing to the vacuum pump from the milk receiving vessel.

The cream may be cooled prior to passing to the collecting receptacle therefor and the cooling device is maintained under the same controlled vacuum as the other parts of the system.

If preferred, both the cream and skim milk can be passed from the separator to the cooler and thence to the cans or other receptacles for collecting the same. This method enables milk to be effectually cleaned of dust or other like impurities with which it may be contaminated in its passage to the separator.

The storage vessel, separator, cooler and receptacles for the cream and milk preferably are arranged whereby the milk and cream will pass by gravity continuously and uninterruptedly through the system without coming into contact with the atmosphere, and means are provided for ensuring a satisfactory operation of the various parts of the apparatus.

The apparatus can be used with or without a cooler and if preferred, instead of delivering the milk or cream to a single can or like receptacle, it can be delivered successively to a number of cans arranged in series or to a series of smaller containers under vacuum.

An important feature of the invention is that the operations of separating, cooling and canning of the cream can be carried out in a room in the vicinity of the milking sheds without fear of the milk or cream being affected by obnoxious odours, and the apparatus can be arranged in a comparatively small space, thereby ensuring economy in installation and convenience of operation.

In this specification the term "back lash" means that equalising or surging action which takes place in the main vacuum line consequent upon the periodic reduction of the vacuum between the opening and closing of the valves of the vacuum pump or during such time as the pulsator admits air to the air line for causing the cessation of the suck period on the cows' teats.

In order that the invention, the object and nature of which have been set forth, may be readily understood, reference will now be had to the accompanying sheets of explanatory drawings wherein:

Figure 1 is a view in side elevation of the best form of apparatus known to me for carrying the invention into practical effect.

Figure 3 is a view partly in section of a separator bowl drawn to a larger scale than Fig. 1 and embodying means for effectually preventing the ingress of air thereto.

Figure 4 is a view in sectional elevation of the lower part of a separator bowl casing drawn to a larger scale than Fig. 3 and showing in greater detail means for preventing the ingress of air to the said casing past the bowl spindle.

Figure 6 is a view in side elevation, partly in section, of a cooler and cream can.

Figure 7 is a view in plan of Figure 6.

Figure 8 is a view in sectional elevation of a cooler seated upon the upper part of a cream can.

Figures 2, 5:
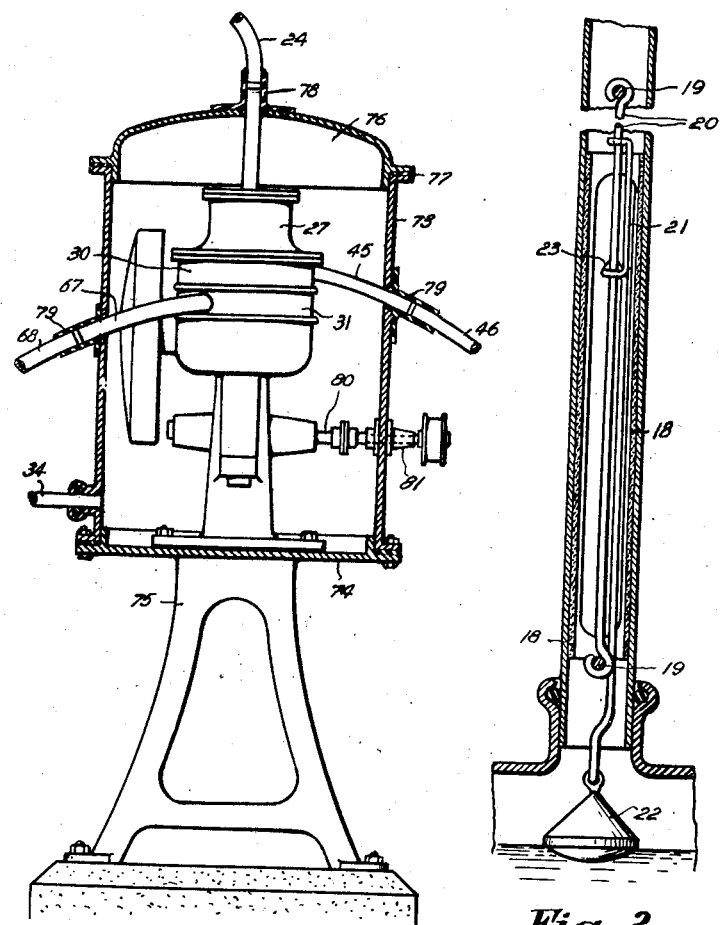
Figure 2 is a view in sectional elevation of a constructional detail which hereinafter is fully described.
Figure 5 is a view in side elevation of a separator drawn to a smaller scale than Fig. 3 and surrounded by a casing shown in sectional elevation and constituting an alternative means for excluding air from the separator bowl.

In these drawings, like characters of reference are employed to indicate the same or corresponding parts in the different views, and the numeral 8 designates a "vacuum" pipe which is arranged to place teat cups (not shown) in communication with a vacuum pump 9 of approved construction. 10 is a milk pipe which is arranged to place the teat cups in communication with a milk storage vessel 11 located at a suitable elevation and constructed as shown or in any other approved way. The milk storage vessel 11 preferably is of sufficient size to accommodate all of the milk obtained from the herd of cow being milked, but it can be much smaller in size.

The milk pipe 10 may pass into a cover 12 removably supported on a flanged opening in the top of the storage vessel and trunnions on the ends of the said vessel can be rotatively supported in straps or hangers 13 supported from an overhead structure or in any other approved way.

The object in supporting the storage vessel as above described is that it can be rotated to place the opening on the underside thereof for convenience in cleaning and draining the same. The storage vessel is retained in its normal position as shown in Figure 1 by a pin 14 which passes through one of the straps or hangers and into a boss on the end of the storage vessel. A branch pipe 15 passes from the vacuum pipe to the top of the milk receiving vessel and a moisture trap 16 is inserted in the length of the branch pipe to prevent any "backlash" therein or ingress of air to the said vessel should a breakdown occur in the vacuum in the pipe 8.

The moisture trap 16 may consist of a bowl 17, preferably of transparent material, and the end of that part of the branch pipe 15 which passes from the storage vessel 11 enters the top of a cover 17' on the bowl and terminates in an angle portion which is provided with a flap valve 17" of approved design. The second part of the branch pipe 15 passes from the top of the cover of the bowl to the vacuum pipe 8. The flap valve in the moisture trap is employed for the purpose of preventing "backlash" of atmosphere laden with oil, and milk and cream vapor from the cooler, the vacuum and skim milk pumps and from the airline which might seriously contaminate the milk or cream.

The "backlash" may occur during the operation of the machine and the moisture trap also serves to prevent inter-communication between the milk and air pipe when the plant is idle and thus it effectually isolates the milk system from the vacuum line and pump during that idle period. The bowl 17 can be readily detached when it is desired to remove any moisture which may have collected therein.

The end of the branch pipe 15 communicating with the milk receiving vessel passes vertically therefrom and is cut away to expose a sight tube 18 of glass which is hermetically sealed therein. The glass tube is located between pins 19 which pass transversely through the branch pipe and support a vertical guide rod 20 upon which is slidably mounted a wire 21 having a float 22 secured to the lower end thereof. The wire is adapted to slide over the guide rod 20 when the float is raised by the milk entering the vessel 11 and a pointer 23 (which is visible through the glass tube) on the said wire, indicates the level of the milk in the said vessel. When the milk rises sufficiently high in the vessel 11 to cause the float to close the lower end of the branch pipe, the milk will be prevented from entering the vacuum system through the said pipe. When the storage vessel is full of milk the milking operation may automatically cease until milk is allowed to flow from the vessel through a discharge pipe 24 detachably connected to a nipple at the lower part thereof. The discharge pipe is provided with a cock 25 which is closed during the milking operation or until the commencement of the separating operation.

The lower end of the discharge pipe 24 is detachably connected to a nipple projecting upwardly from a lid 26 on the float cup 27 of a cream separator 28. A gasket of rubber 29 (see Fig. 3) or other suitable material is located between the lid and float cup to prevent the ingress of air to the said float cup. When the apparatus is in operation, the float cup 27 and covers 30 and 31 also rest upon gaskets 32 which effectually seal the connections between these parts and exclude air therefrom.

The bowl casing 33 of the separator is connected by means of a branch pipe 34 to the main vacuum pipe 8 connected thereto. Thus it will be understood that the interior of the separator bowl and the covers thereon will be maintained under vacuum. In order to prevent oil or vapor being drawn into the separator bowl from the gear casing or driving mechanism, a sealing device 35' is disposed about the bowl spindle 35 at the point where it enters the bowl casing.

In Figure 4 is shown one form of sealing device which consists of a flanged sleeve 36 of leather or like material secured to the underside of the bowl casing or part fitted thereto and surrounds the spindle. The thin sleeve fits closely against the spindle and when vacuum is applied to the bowl casing, the sleeve is drawn sufficiently close to the spindle to effectually prevent oil and vapor passing into the separator bowl from the gear casing or driving mechanism situated therebelow.

An additional sealing device is located below the bowl casing and comprises a cap 37 having a ring or washer of felt 38 or like substance accommodated in a groove in the underside thereof. A ring or collar 39 is fitted tightly on the spindle 35 and a thin flange 40 on the said ring or collar is arranged to bear against the underside of the felt washer.

The vacuum within the bowl casing ensures the thin flange 40 bearing sufficiently hard upon the felt washer to effect a perfect seal between the gear casing and the bowl. Either or both of the sealing devices may be employed.

When the separator is in operation the sealing devices will permit the spindle to rotate freely and effectually seal the gear casing from the separator bowl casing.

The cream separated from the skim milk passes through a spout 45 on the cover 30 to a pipe 46 which enters a removable cover on the top of a cooler 47 located above and arranged in communication with a cream can 48 by means of a pipe 49.

The top of the cooler is connected to the branch pipe 34 leading to the main vacuum pipe 8 by means of the T 34' and a moisture trap 50 similar to 16 is located at any desired point in the length of the said branch pipe 34, for isolating the milk system from the vacuum line and pump.

A cock 51 in the said branch pipe 34 can be adjusted to control the vacuum in the separator, cooler and cream can. The cream passing through the pipe 46 gravitates into a channel 52 formed at the upper end of a corrugated jacket 53 of slightly tapered formation located within the cooler. Cool water is circulated through the space between the jacket and wall of the cooler by means of an inlet pipe 54 and an outlet pipe 55. Cold water can be circulated through the pipes by means of gravity or in any other approved way and a tap 56 in the pipe 54 can be adjusted to regulate the flow of the cooling water as desired.

The cream delivered to the channel 52 at the upper end of the cooler flows over the edge thereof and is effectually cooled and deodorised as it gravitates in a thin film over the corrugated wall of the jacket. The cooled cream gravitates from the cooler through the pipe 49 into the cream can located therebeneath.

The pipe 49 is connected to a nipple 57 fitted to the lid of the cream can and having a tap 58 therein which is turned off when the can is full. The lid of the cream can is fitted with a second nipple 59 which is connected to the branch pipe 34 of the vacuum system by a pipe 60 and the said nipple is provided with a tap 61 which can be turned off to maintain a vacuum in the top of the filled can. Thus, when it is desired to maintain the cream can under vacuum until it is delivered to a butter factory or other place, both taps 58 and 61 are turned off before the pipes 49 and 60 are disconnected from the nipples 57 and 59 respectively.

The lid of the cream can is seated on a rubber or like gasket 62 to ensure the vacuum being retained in the can. The removable cover on the cooler is likewise seated on a rubber or other gasket 63 to ensure air being excluded from the cooler when the apparatus is in operation. When the cover is removed from the cooler, a free access can be had to the interior of the latter for cleaning purposes.

If preferred, the cooler 47 can be seated upon the top of a cream can, and for this purpose a flange 64 depending from the bottom of the cooler is adapted to pass into the mouth of the said can. A gasket 65 of rubber or like material is fitted around the depending flange 64 and effects an air tight seal between the cooler and the can.

In Figure 8 the cooler is shown seated upon the top of a cream can and a helical baffle 66 in the jacketed space of the cooler is provided to ensure an effective circulation of the cooling water.

When a number of cream cans are arranged in series, they are connected by pipes so that as one can of the series is filled, the cream will flow to the next can and so on until they are all filled. Prior to removing the filled cans, the taps 58 and 61 in the nipples on the lids thereof are turned off to maintain a vacuum in the cans, and the cocks 25 and 51 are turned off to stop the flow of milk from the storage vessel and the break down of the vacuum in the system.

If preferred, the cocks 25 and 51 can be so arranged that they may be operated simultaneously by actuating suitable connecting devices (not shown).

A spout 67 from the cover 31 directs the skim milk from the separator to a pipe 68 which enters the top of a closed tank 69 for receiving the same. The bottom of the tank 69 is connected by a pipe 70 to a pump 71 which is adapted to deliver the skim milk to an elevated storage tank (not shown) or any other approved point. The pipe 70 can be provided with a suitable non-return valve 70' similar to those employed in the moisture traps 16 and 50, and/or a relief valve, of approved design.

In lieu of passing the skim milk to the tank 69, it can be taken direct to the inlet 82 of the pump 71 through a pipe 70.

If preferred, the pump 71 can be dispensed with and the skim milk can be retained under vacuum in the tank 69 by connecting the top thereof to the branch pipe 34 near the separator.

In lieu of passing the skim milk from the separator to the tank 69 it may be passed to the top of the cooler by connecting the spout 67 by a pipe thereto so that both the cream and skim milk will flow into the channel 52 and gravitate therefrom over the corrugated surface of the jacket 53. By this means the skim milk and cream will be mixed and cooled and will pass as whole milk to the can or cans 48.

It will be understood that in the above adaptation of the invention, a centrifugal clarifying apparatus may be used under vacuum to remove the solid and other impurities from the milk without separating the cream therefrom.

In the modification of the apparatus shown in Figure 5, the separator is enclosed within a casing 73 which is bolted to a flanged plate 74 mounted on the stand 75. The casing 73 is provided with a removable top 76 having a flange which rests upon a rubber or like gasket 77 seated upon the top of the casing to effectually exclude air therefrom. The milk pipe 24 is arranged to pass through the top of the casing and deliver milk to the float cup of the separator and a rubber sleeve 78 or like means is provided to seal the opening for the pipe in the said casing.

The spouts 45 and 67 pass through holes in the sides of the casing 73 and flanged rubber sleeves 79 connect the pipes 46 and 68 respectively thereto, and also seal the holes in the casing. The branch pipe 34 is detachably connected to the casing 73 as shown or in any other approved way.

The drive spindle 80 of the separator passes through the side of the casing and the opening provided therefor is sealed by a sleeve 81 of the type shown in Figure 4 or by other approved means. When the separator is driven by an electric motor, the leads thereto pass through the sides of the casing and means are provided for preventing the entrance of air to the casing at this point.

The casing enclosing the separator can be made sufficiently large to enable ready access to all the parts of the separator for cleaning and other purposes when the cover is removed from the said casing. When the separator is enclosed within a casing as above described, the atmosphere will be excluded therefrom, and it will be maintained under vacuum while in operation.

In Figure 1 of the drawings, the various parts of the invention have been shown arranged in such a way that the operation can be easily followed, but in practice they would be arranged in a more compact form whereby they can be conveniently controlled and saving of space and cost of installation achieved.

An apparatus constructed as above described is easy to handle and the parts thereof are readily accessible for adjustment and they can be easily dismounted for cleaning purposes and assembled without the aid of tools.

The invention provides an entirely enclosed system of separating and cooling milk and cream under a constant vacuum in association with or forming part of a milking plant and the whole milk, cream and skim milk obtained by the use of the invention will be effectually deodorised and be free from impurities, and a high quality product will be ensured.

Moreover, the milk is kept approximately at blood heat and in this condition is passed to the separator thereby enabling a better separation of the cream and the deodorization of the volatile content of the milk and cream is effected to a greater degree than when cooled by contact with the atmosphere or artificially reheated to achieve the same result.

Throughout this specification and the following claiming clauses the term "vacuum" is to be understood to mean a degree of vacuum equal to or approximating that ordinarily employed in milking machine plants.

An apparatus constructed and arranged as hereinbefore described and as illustrated in the drawings will enable the invention to be carried into practical effect, but as various changes can be effected in the construction and arrangement of the parts, I do not wish to be understood as limiting myself to the example described and shown.

I claim:

1. An apparatus for clarifying and deodorizing milk and cream comprising a closed milk receiving vessel, a clarifier having an enclosed float bowl arranged in communication with the milk receiving vessel, a closed cream cooler arranged in communication with the covers and bowl of the separator, a container arranged in communication with the cooler, a vacuum pump, pipes connecting the vacuum pump to the receiving vessel, the clarifier, cooler and receptacle, and valve controlled devices in the lengths of the vacuum pipes for preventing the admission of air or vapor to the different units when the vacuum pump is inoperative.

2. An apparatus comprising closed milk receiving milk clarifying or separating units and collecting receptacle, arranged in communication with each other and at progressively lower levels, a vacuum pump, a main vacuum pipe connected to the pump, branch pipes passing from the main vacuum pipe to the receiving and clarifying units and to the collecting receptacle for maintaining a balanced vacuum therein, devices for excluding air from the different units, moisture traps in the branch pipes of the vacuum pipe, valves in the moisture traps for excluding air and vapor from and maintaining a vacuum in, the different units when the vacuum pump is inoperative, and a float controlled valve for closing the vacuum branch pipe leading to the receiving unit.

3. An apparatus according to claim 2 wherein means are provided for detachably connecting the branch pipes passing from the main vacuum pipe to the different units.

4. An apparatus comprising a milk receiving unit, a cream separating unit, cooling unit and a can detachably connected to each other and arranged whereby the milk will flow by gravity from the receiving unit to the separating unit, and the cream will flow by gravity from the separating unit to the cooling unit and can, a tank for receiving the skim milk from the separating unit, a vacuum pump having a main vacuum pipe connected thereto, branches from the main vacuum pipe to the different units of the apparatus, moisture traps in the lengths of the said branch pipes, and gravity valves in the moisture traps adapted to close and isolate the units from the vacuum pump when the said vacuum pump is inoperative.

5. An apparatus according to claim 4, a branch pipe connecting the vacuum pump to the bottom of the bowl casing of the separator unit, to the top of the cooling unit and to the top of the can and skim milk tank, and a cock in the said branch pipe.

6. In an apparatus according to claim 4, a branch vacuum pipe connected to the top of the milk receiving unit, a float controlled valve for cutting off the vacuum from the receiving unit, a cover removably fitted to the top of the float cup of the separating unit, and a pipe passing from the bottom of the milk receiving unit into the top of the float cup on the bowl of the separating unit.

7. In an apparatus according to claim 4, a cover on the float cup of the separator for excluding air therefrom, a pipe connection between the top of the cover and the lower part of the milk receiving unit, a cock in the pipe, and means for preventing the ingress of air and vapor to the covers and lower part of the bowl of the separating unit.

8. An apparatus comprising a closed vessel for receiving milk from a milking machine, a vacuum pump, a pipe passing from the closed vessel to the vacuum pump, a moisture trap and and a non-return valve in the vacuum pump, a separator having the covers, bowl and float cup thereof sealed to exclude air therefrom, a valve controlled pipe connecting the float cup of the separator to the milk receiving vessel, a closed cooler connected by a pipe to the cream cover of the separator, a pipe passing from the cooler to the vacuum pump, a moisture trap and a non-return valve in the pipe passing from the cooler to the vacuum pump, a closed cream tank connected by a pipe to the lower part of the cooler, branch pipes connecting the cooler and can to the vacuum pipe, a tank for receiving skim milk from the separator, a pipe connecting the said tank with the skim milk cover of the separator, and a pipe connecting the skim milk tank to the vacuum pump.

9. An apparatus comprising a closed milk receiving vessel arranged in communication with a milking machine, a closed separator located below and connected by a pipe to the lower part of the milk receiving vessel, a closed cream cooler located below the separator connected to the cream bowl thereof by means of a pipe, a discharge pipe from the bottom of the cooler, a vacuum pump having a main vacuum pipe connected thereto, a valve controlled branch pipe passing from the vacuum pipe to the cooler and separator, and a second valve controlled branch pipe connecting the main vacuum pipe to the milk receiving vessel.

HECTOR MURDOCH McDONALD.